United States Patent
Kapoor et al.

(10) Patent No.: US 10,423,639 B1
(45) Date of Patent: Sep. 24, 2019

(54) AUTOMATED CUSTOMIZATION PRESERVATION

(71) Applicant: Numerify, Inc., Cupertino, CA (US)

(72) Inventors: Rahul Kapoor, Cupertino, CA (US); Renu Chintalapati, San Ramon, CA (US); Abha Jain, Sunnyvale, CA (US)

(73) Assignee: Numerify, Inc., San Jose, CA (US)

( * ) Notice: Subject to any disclaimer, the term of this patent is extended or adjusted under 35 U.S.C. 154(b) by 634 days.

(21) Appl. No.: 14/270,984

(22) Filed: May 6, 2014

(51) Int. Cl.
*G06F 16/25* (2019.01)

(52) U.S. Cl.
CPC .................................. *G06F 16/254* (2019.01)

(58) Field of Classification Search
None
See application file for complete search history.

(56) References Cited

U.S. PATENT DOCUMENTS

| | | | |
|---|---|---|---|
| 7,681,185 B2 | 3/2010 | Kapoor et al. | |
| 7,987,159 B2 | 7/2011 | Gopal et al. | |
| 2006/0235831 A1* | 10/2006 | Adinolfi | G06Q 40/00 |
| 2011/0125705 A1* | 5/2011 | Aski | G06F 8/30 |
| | | | 707/602 |
| 2014/0040182 A1* | 2/2014 | Gilder | G06F 17/30578 |
| | | | 707/602 |
| 2014/0304694 A1* | 10/2014 | Huff, II | G06F 8/658 |
| | | | 717/168 |
| 2014/0310231 A1* | 10/2014 | Sampathkumaran | G06F 17/30563 |
| | | | 707/602 |
| 2015/0089476 A1* | 3/2015 | Dhoolia | G06F 8/71 |
| | | | 717/122 |

* cited by examiner

*Primary Examiner* — Giuseppi Giuliani
(74) *Attorney, Agent, or Firm* — Rahman LLC

(57) ABSTRACT

Approaches for preserving customizations made to a data management system. Metadata that identifies a mapping between data fields of one or more data source schemas to columns of one or more data tier schemas is maintained. Each of the one or more data tier schemas stores data retrieved from the one or more data source schemas. Values from the metadata are read to dynamically generate software processes. The software processes may update one or more existing ETL processes to reflect an updated state of the one or more data tier schemas and may generate any new ETL processes required to retrieve data stored in the one or more data source schemas and load the retrieved data into the one or more data tier schemas. Customizations made to portions the data management system are preserved in an automated fashion when new versions of system components are deployed.

15 Claims, 5 Drawing Sheets

| Source system driven customizations | Overlapping |
|---|---|
| New source attribute mapped to new attribute of an existing data tier entity | NO |
| New source attribute mapped to an existing attribute of a data tier entity | O |
| New source attribute mapped to a new data tier entity | NO |
| New source entity(s) mapped to one or more new data tier entities | NO |
| New source entity(s) mapped to one or more existing data tier entities | O |
| New source entity(s) mapped to a mix of new and existing data tier entities | O |
| New source entity(s) joined with existing entity(s) then mapped to one or more new data tier entities | NO |
| New source entity(s) joined with existing entity(s) then mapped to one or more existing data tier entities | O |
| New source entity(s) joined with existing entity(s) then mapped to a mix of new and existing entities | O |
| In a customer's installation a mapped source attribute is absent | O |
| A customer's installation has changes to mapped source attributes (name/type) | NO |
| Source entity(s) mapped to one or more data tier entities are absent | O |
| Source entity(s) joined w/ others and mapped to one or more data tier entity are absent | O |
| A customer's installation renames source entity(s) | NO |

410 — New source attribute mapped to new attribute of an existing data tier entity
412 — New source attribute mapped to an existing attribute of a data tier entity
414 — New source attribute mapped to a new data tier entity
416 — New source entity(s) mapped to one or more new data tier entities
418 — New source entity(s) mapped to one or more existing data tier entities
420 — New source entity(s) mapped to a mix of new and existing data tier entities
422 — New source entity(s) joined with existing entity(s) then mapped to one or more new data tier entities
424 — New source entity(s) joined with existing entity(s) then mapped to one or more existing data tier entities
426 — New source entity(s) joined with existing entity(s) then mapped to a mix of new and existing entities
428 — In a customer's installation a mapped source attribute is absent
430 — A customer's installation has changes to mapped source attributes (name/type)
432 — Source entity(s) mapped to one or more data tier entities are absent
434 — Source entity(s) joined w/ others and mapped to one or more data tier entity are absent
436 — A customer's installation renames source entity(s)

FIG. 3

| Data tier model driven customizations | Overlapping |
|---|---|
| New metric/aggregate in data tier entities | NO |
| Existing metric calculation customization | O |
| New attribute mapped to an already existing source table | NO |
| New attribute mapped to a new source table | NO |
| New dimension or fact mapped to already existing source table(s) | NO |
| New dimension or fact mapped to new source table(s) | NO |

510 — New metric/aggregate in data tier entities
512 — Existing metric calculation customization
514 — New attribute mapped to an already existing source table
516 — New attribute mapped to a new source table
518 — New dimension or fact mapped to already existing source table(s)
520 — New dimension or fact mapped to new source table(s)

FIG. 4

| Reporting driven customizations | Overlapping |
|---|---|
| New report created for a customer | NO |
| Existing report modified to use one or more new attributes or metrics on existing entities | NO |
| Existing report modified to use one or more new entities | NO |
| Existing report modified to drop one or more entities | NO |

610 — New report created for a customer
612 — Existing report modified to use one or more new attributes or metrics on existing entities
614 — Existing report modified to use one or more new entities
616 — Existing report modified to drop one or more entities

FIG. 5

| ETL driven customizations | Overlapping |
|---|---|
| Change to list of Slowly Changing Dimension columns for existing dimensions | O |
| Change to existing lookups | O |
| Creation of new lookups | NO |

710 — Change to list of Slowly Changing Dimension columns for existing dimensions
712 — Change to existing lookups
714 — Creation of new lookups

FIG. 6

AUTOMATED CUSTOMIZATION PRESERVATION

FIELD OF THE INVENTION

Embodiments of the invention relate to an automated approach for persisting and preserving customizations made to computerized data management systems.

BACKGROUND

Different computerized systems use data in different ways. The way in which data is used informs how the data is stored and maintained. To illustrate this widely recognized principle, the domains of data warehousing, operational reporting, and data archiving, and data feeds will be briefly discussed.

A data warehouse is a database used for generating reports and data analysis. To facilitate reporting and data analysis functions, data is often transformed and organized in star schemas within a data warehouse. Populating the data within the data warehouse is done via ETL (Extract, Transform, Load) operations, which requires that the ETL system maintain, in addition to the current state of the data warehouse, information about the last incremental data extractions obtained from the source tables. ETL operations propagate incremental changes made at the source tables into the star schemas of the data warehouse. ETL operations may transform the data prior to loading the data into the data warehouse. Examples of such types of transformation include data cleansing, data standardization, surrogate key generation, surrogate key replacement, unit of measure conversion, and currency conversion. Business intelligence (BI) applications use data gathered from a data warehouse or a subset of the warehouse called a data mart.

Operational reporting refers to reporting about operational details of current activity. For operational reporting, queries need to be performed against current data, in contrast to analytical reporting where historical data suffices and there is no requirement to query the latest data in real time. Therefore, operational reporting queries are performed against live systems to ensure the data is the most currently available. In operational reporting, the freshness of the data and a quick response time are valued more than storing large amounts of data over a long period of time.

Data archiving is the process of moving data that is no longer actively used to a separate data storage device for long-term retention. While data archiving requires saving both the current version of data as well as any historical version of data, it does not require the data to be stored in any particular format, such as a star schema. Speed of access is not a primary concern in data archiving, as data retained on a long-term basis in the data archive will not be accessed frequently but in contrast to data protection and backup products, the data in archiving products needs to be searchable and queryable by end users and eDiscovery applications.

Data feed systems allow users to receive updated data from data sources as the data changes at the data source. Data feed systems can supply data in the same format as the data source or in different formats (ex. star schema) which provide value add over the source format. Historical data feeds will supply, in addition to the current state of data at the data source, historical state of the data at a previous point in time.

Users of these types of computerized systems will often have different preferences for what types of data the systems should track and how the system should work. Not surprisingly, these types of computerized systems are often highly customized upon installation. For example, different companies using a data warehousing application may wish to customize portions of the applications, such as the default dashboards and reports, to better reflect their needs.

For a particular company to make such customizations to the features of the default version of the application, the dimensional model used by the application to storing data may need to be changed to support the customizations. The customizations made to the dimensional model used by the data warehouse application for that company will, in turn, require the company to make customizations to the ETL pipeline to populate data in the customized warehouse dimensional model. It is also possible that companies may have customized one or more data sources from the standard image and may desire that those customizations be reflected in the dashboards and reports provided by the data warehouse application, which would again require the source image for the data warehouse application to be customized along with the ETL pipeline, the dimensional model, and the reports and dashboards. Once a company has a customized data management system, they would also expect that the customizations be preserved across release updates of the underlying software.

As all software evolves over time, release updates are unavoidable and they are generally performed on the base image of the previous release of the software. As the company's customized image could be different in many ways than the base image, preserving the company's customizations while upgrading them to the new release is a challenge.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 3 is a chart illustrating the how customizations performed to a data source schema may be assessed according to an embodiment of the invention;

FIG. 4 is a chart illustrating the how customizations performed to the schema used by data tier may be assessed according to an embodiment of the invention;

FIG. 5 is a chart illustrating the how customizations made to reports generated by one or more of data management applications may be assessed according to an embodiment of the invention;

FIG. 6 is a chart illustrating the how customizations made to ETL processes may be assessed according to an embodiment of the invention.

DETAILED DESCRIPTION OF THE INVENTION

Figure 1:
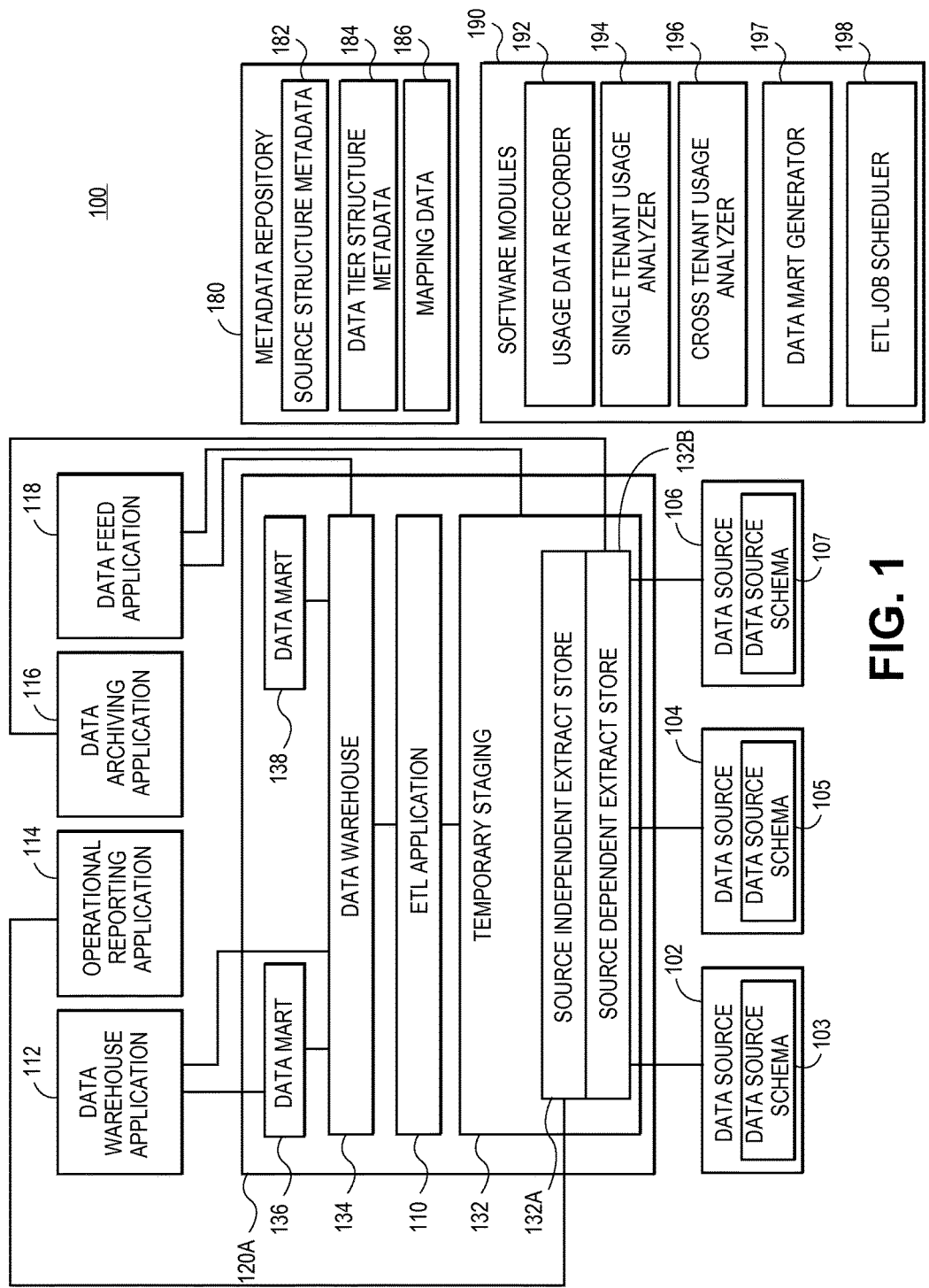
FIG. 1 is a block diagram of the components of a first exemplary data management system according to one embodiment of the invention.

Approaches for an automated preservation of customizations made to a data management system are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Organizations and businesses are often comprised of various operational units having different data storage and reporting requirements. For example, the financial department of a company may need financial reports generated from data stored using a financial application, while the marketing department may need information stored in an entirely different database than used by the financial application.

Typically, each operational unit may use one or more different types of applications to manage and analyze data according to their needs. Depending on the particular functions performed by the application, the application might be considered to be a data warehousing application, an operational reporting application, a data archiving application, or a data feed application (each of these four types of applications shall be referred to herein as a data management application). Each of these types of data management applications may allow one to view and analyze data retrieved from one or more data sources that use a data model that evolves over time. For example, the data model may have one or more entities or attributes renamed, added, or deleted. Such customizations may flow naturally and occur periodically over time as a result of adjusting the data model used by the data source to persist data to meet the changing needs and requirements of a particular implementation.

In addition to customizing the data schema used by a data source, a company may wish to customize aspects of a data management application which operates on data retrieved from the data source to better reflect their business, and in the process of doing so customize the data schema used by data management applications to persistently store data. A company or organization may wish to perform other types of customizations. For example, it may be desirable to change how a data management application generates reports. As another example, it may be desirable to customize one or more ETL (Extract, Transform, Load) processes, which govern how data is retrieved from a data source, processed, and populated into the data schema used by the data management application.

Embodiments of the invention discussed herein advantageously provide approaches that allow many different companies or organizations to use one or more data management applications to manage their own data. Embodiments may support a wide variety of customer customizations in an efficient and automated manner. As described in more detail below, a data management system of an embodiment may allow a company to use prepackaged data management applications in different business domains, such as like Financial Analytics, IT Service Management, Sales, and Marketing analytics. These data management applications may manage and process data obtained from one or more business source systems. In doing so, the data may be transformed to a form more amenable for the performance of analytics by the data management applications.

While data management systems of an embodiment enable the use of prepackaged data management applications, it is anticipated that facets of these data management applications will require customization to support the individual and unique needs of the company or organization using the business management applications. For example, it is anticipated that data management systems of an embodiment will need to support customization made to (a) the data schemas used by the data management applications and/or data sources, (b) reports generated by the data management applications, and (c) ETL processes involving the data management applications. The prior art currently supports such customizations by creating a release update per customer (where a customer is a particular company or organization) based on the customer's last customized image of the data management application suite, manually analyzing and comparing customer customizations to the changes in the release update, manually identifying what customer customizations can be preserved and what can't, and manually handling those customizations which can be preserved; however, this approach cannot scale for a service provider with a large number of customers that each have a large number of disparate customizations.

Overcoming obstacles unsurmounted by the prior art, embodiments of the invention support a wide variety of customizations by employing an automated code-driven approach based upon stored metadata. In an embodiment, metadata that describes both the structure of data schemas employed by data sources (termed "data source schemas") and the data schemas employed data management applications (termed "data tier schemas") is stored. In addition, metadata that describes a mapping between the data source schemas and data tier schemas is stored. Metadata that describes how ETL processes and reporting functionality should be performed based on the structure of the data source schemas and the data tier schemas is also stored and maintained. In embodiments, software modules perform automated functions to support customizations for all customers of the data management system. Such automated functions may be performed by generating executable code whose execution depends upon values read from the stored metadata.

To illustrate one example, if stored metadata indicates that a new metric has been added by a particular customer to a particular data management application, then one or more software processes are automatically initiated to determine whether a data tier schema needs to change to accommodate the new metric, and if so, the data tier schema for that customer only is automatically updated in that manner. Moreover, one or more software processes may analyze the stored metadata to determine whether any existing ETL processes for that customer need to be updated or if any new ETL processes need to be created for the customer to support this customization. As other examples, one or more software processes may be automatically initiated to review the metadata to determine if the mapping between the data source schemas and the data tier schemas need to be updated for that customer and if any data needs to be moved or populated within the data tier schemas in view of any change made to a data tier schema. These are but a few examples of some of the ways customizations may be supported, as many more approaches for doing so are discussed herein.

Prior to discussing how the metadata based code generation approach of the invention may use metadata to support a wide variety of customizations performed to a data management system of an embodiment, it will be helpful to appreciate the architecture of certain illustrative embodiments, as discussed in the next section.

Architecture Overview

Embodiments of the invention advantageously provide for a data management system which supports customer customizations in an efficient and automated manner. FIG. 1 is a block diagram of the components of a data management system 100 according to one embodiment of the invention. System 100 includes data sources 102, 104, and 106, data tier 120A, one or more data management applications 112, 114, 116, and 118, metadata repository 180, and software modules 190.

Data sources 102, 104, and 106 are broadly meant to depict any source from which data may be obtained. In practice, one or more of data sources 102, 104, and 106 may correspond to business application sources like SalesForce, NetSuite, ServiceNow, Marketo, or Eloqua; data may be extracted from such business application sources using the API's provided thereby. One or more of data sources 102, 104, and 106 may also correspond to public or government databases; for example, such databases may store information about weather, currency exchange rates, public government records, and the like. While only three data sources are depicted in FIG. 1; embodiments of the invention may be used with any number of data sources. Data source 102, 104, 106 each may persist data using data source schema 103, 105, 107 respectively. Note that each company or organization storing data in or retrieving data from a data source (such as data source 102, 104, and 106) may wish, at any time and at multiple occasions, to customize the data source schema employed by the data source.

The data tier, as broadly used herein, refers to any computerized approach for storing data which may be accessed by a data management application, such as, for example, data management applications 112, 114, 116, and 118. A particular example of a data tier is depicted in FIG. 1 and identified as data tier 120A. As shown in FIG. 1, data tier 120A may comprise a temporary staging area 132, an ETL application 110, a data warehouse 134, and one or more data marts 136, 138.

Temporary staging area 132 broadly refers to any mechanism for temporary storing data retrieved from data sources 102, 104, and 106 to facilitate its use by data management applications 112, 114, 116, and 118. Once data is populated in temporary staging area 132, the data may be formatted or processed prior to loading the data into data warehouse 134. For example, in data tier 120A depicted in FIG. 1, temporary staging area 132 comprises a Source Independent Extract Store 132A and a Source Dependent Extract Store 132B. In this example, data that is retrieved from a data source may be stored directly into Source Dependent Extract Store 132B. Thereafter, the data may be modified to transform the data into a source dependent format and moved to Source Independent Extract Store 132A. As implied by the name, once data has been moved from temporary staging area 132 to data warehouse 134, the data may be removed from temporary staging area 132

ETL application 110, as broadly used herein, refers to one or more applications for extracting data from temporary staging 132, potentially performing one or more data transformations on the extracted data, and loading the transformed data into data warehouse 134. ETL application 110 may retrieve an initial extract of data from temporary staging 132 and thereafter retrieve incremental extracts corresponding to the changes made at a data source since the data was last retrieved therefrom. Prior to loading the extracted data into data warehouse 134, ETL application 110 may perform a variety of data transformations on the extracted data, such as but not limited to archival processes, CDC (change data capture) processes, source dependent to source independent processes, delta propagation processes, surrogate key generation processes, and surrogate key replacement processes. Processes for performing data transformations are well understood to those skilled in the art and will not be expounded upon herein.

Data warehouse 134, as used herein, refers to a database for reporting and data analysis. Data stored by data warehouse 134 may be obtained from a plurality of sources, namely data sources 102, 104, 106. Data warehouse 134 may store current and historical data and may be accessed by one or more of data management applications 112, 114, 116, and 118.

Data marts 136, 138, as used herein, each correspond to a database that stores a subset of the data stored in data warehouse 134. The data stored within data marts 136, 138 typically serves a particular focus; for example, a particular dart mart might serve a specific business line or team. While only two data marts, namely dart marts 136, 138, are depicted in FIG. 1 for clarity, embodiments of the invention may employ any number of data marts, including no data marts, one data marts, or three or more data marts.

Data management applications 112, 114, 116, and 118 may access either data marts 136 and 138, data warehouse 134, and/or from temporary staging area 132, depending upon the needs of a particular implementation. For example, FIG. 1 depicts data warehouse application 112 accessing data stored in data mart 136, operational reporting application 114 accessing data stored in Source Independent Extract Store 132A, and data archiving application 116 accessing data from Source Dependent Extract Store 132B. Of course, these are but a few examples, as other implementations may confirm a data management application to access, read, or store data differently, e.g., FIG. 1 also depicts data warehouse application 112 having the capability of accessing data from data warehouse 134.

While FIG. 1 depict a way to implement a data tier, embodiments of the invention may persist data in a data tier in many different ways; consequently, embodiments of the invention do not rely upon any particular mechanism for implementing a data tier. Embodiments of the invention may operate with any implementation of a data tier so long as the data tier is capable of persisting data in one or more data tier schemas. As used herein, the term "data tier schema" refers to a schema used to persistently store data in the data tier. A data tier schema may be used in data warehouse 134, data mart 136, data mart 138, Source Independent Extract Store 132A, or Source Dependent Extract Store 132B, for example.

Data warehouse application 112, operational reporting application 114, data archiving application 116, and data feed application 118, as broadly used herein, refer to applications or services which may issue queries for data to the data tier and, in turn, use the data retrieved from the data tier in disparate ways. While system 100 depicts the inclusion of data warehouse application 112, operational reporting application 114, data archiving application 116, and data feed application 118, the presence of these applications is optional, as a particular implementation of system 100 need not include each of applications 112-118. Therefore, system 100 may include any combination of applications 112-118.

Metadata repository 180, as broadly used herein, refers to any mechanism for storing metadata. The metadata stored in metadata repository 180 describes the customizations performed by a customer throughout system 100. This metadata may be used to describe how data is stored at a data source or at data tier 120A as well as provide insight into how data originating at a data source is used by all aspects of system 100. Further, this metadata may be used to customize the operation of software modules 190.

Different types of metadata may be stored in metadata repository 180. To illustrate, metadata repository, in an embodiment, may store source structure metadata 182, data tier structure metadata 184, and mapping data 186. Source structure metadata 182 describes the structure, characteristics, and configurations of a data source (including the data source schemas), data tier structure metadata 184 describes the structure, characteristics, and configuration of aspects of the data tier (including data tier schemas), and mapping data 186 describes a mapping or relationship between attributes of data source schemas to attributes of data tier schemas. In this way, the metadata stored by metadata repository 180 may be used to view how data flows through system 100 and how a change to an aspect of one type of data affects other portions of system 100. The use of metadata stored by metadata repository 180 shall be described in more detail in the next section.

Software modules 190 refers to a set of software processes or modules which are responsible for performing automated functions based on the metadata stored in metadata repository 180, e.g., software modules 190 support customizations made by a particular company or organization to components of system 100. Software modules 190 may be composed in a dynamic fashion based on the metadata stored in metadata repository 180.

Source metadata change detection module 192, as broadly used herein, refers to one or more processes for detecting a customization made to a data source, such as a change made by a customer to a default version of a data source schema. Source metadata change detection module 192 may ascertain the structure of data source schemas using APIs exposed by the corresponding data source. Source metadata change detection module 192 may periodically execute and use the API of a particular data source to ascertain information about the structure of a data source schema. By comparing information learned in this manner across different points in time, source metadata change detection module 192 can ascertain if a customer has made a customization to data source 102, 104, or 106. Upon determining that a customization to a data source has been made, source metadata change detection module 192 may notify change impact analysis module 194 so that change impact analysis module 194 can assess the impact of the detected customization upon other parts of system 100.

Change impact analysis module 194, as broadly used herein, refers to one or more processes for assessing the impact and implications of customizations performed or requested by a customer upon other portions of system 100. Metadata stored in metadata repository 180 indicates the lineage of how data moves through system 100; for example, mapping data 186 contains information that describes what attributes of data source schemas are mapped to attributes of data tier schemas. In response to being notified that an aspect of a data source schema has changed, change impact analysis module 194 may read mapping data 186 to determine what other portions of system 100 are affected by a changed attribute or entity, as mapping data 186 contains information describing how that changed attribute or entity may affect other schemas, reports, or ETL processes. To illustrate a simple example, if a customer performs a customization on a data source schema to change the data type of a particular attribute 186 Integer to String, then change impact analysis module 194 may review mapping data 186 to identify any report, data tier schema, or ETL process which will need to be updated to accommodate that customization. After change impact analysis module 194 determines the impact on system 100 caused by a particular customization at a data source, change impact analysis module 194 notifies change characterization module 195.

Change characterization module 195, as broadly used herein, refers one or more processes for characterizing a particular change made to a data source. After characterizing a particular change made to a data source, change characterization module 195 may perform a responsive action to accommodate the change, such as (a) ignore the change made to the data source, (b) automatically update data tier structure data 184 and/or mapping data 186 stored in metadata repository 180, without human input or instruction, to allow the change made to the data source to be accommodated by system 100, or (c) request user input on what actions should be performed in response to the change made to the data source. Change characterization module 195 may solicit and receive user input, if need be, via a user interface according to a variety of different implementation designs. If change characterization module 195 updates data tier structure data 184 and/or mapping data 186 stored in metadata repository, change characterization module 195 may notify code generator module 197 so that code generator module 197 may implement the changes specified by the updated metadata.

Code generator module 197, as broadly used herein, refers to one or more processes for implementing changes specified by metadata stored in metadata repository 180. Code generator module 197 may read values stored in metadata repository and thereafter use the read values as input to executable code, which when executed, causes changes to the structure or operation of data tier 120A to reflect the metadata stored in metadata repository 180. For example, code generator module 197 may make a change to a data tier schema and potentially as a result, move and/or transform data from one data type to another data type based on the schema change. In addition to making changes to data tier schemas and moving/transforming data, code generator module 197 may also update, add, or delete executable jobs responsible for ETL processes, reports, dashboards, and any other functional aspect of how data may be used in system 100.

Versioning module 196, as broadly used herein, refers to the one or more processes responsible for updating metadata stored in metadata repository in response to a change detected in either a data source or in the data tier. Versioning module 196 may record information describing the circumstances of what was changed each time metadata is updated to reflect that change. In this way, changes in system 100 are always made in a versioning manner so that discrete changes made to system 100 may be analyzed at a future date in a meaningful manner.

Customization preservation module 198, as broadly used herein, refers to one or more processes for determining which customer specific customizations can be supported in a new customer-wide version of schemas employed by the data tier released by the operator of system 100. In an embodiment, each new customer-wide version of schemas employed by the data tier released by the operator of system 100 will correspond to a particular version of data tier structure data 184. For example, if the operator of system 100 wishes to deploy an updated version of data tier structure data 184, then customization preservation module 198 may be used to determine how customer specific customizations can be supported in a new version of metadata. The operation of customization preservation module 198 is described below in detail with reference to step 330 of FIG. 2.

Having provided a description of the components of system 100, additional details of how a data management system may support customer customizations according to an embodiment of the invention are presented below.

Automated Customization Preservation

Figure 2:
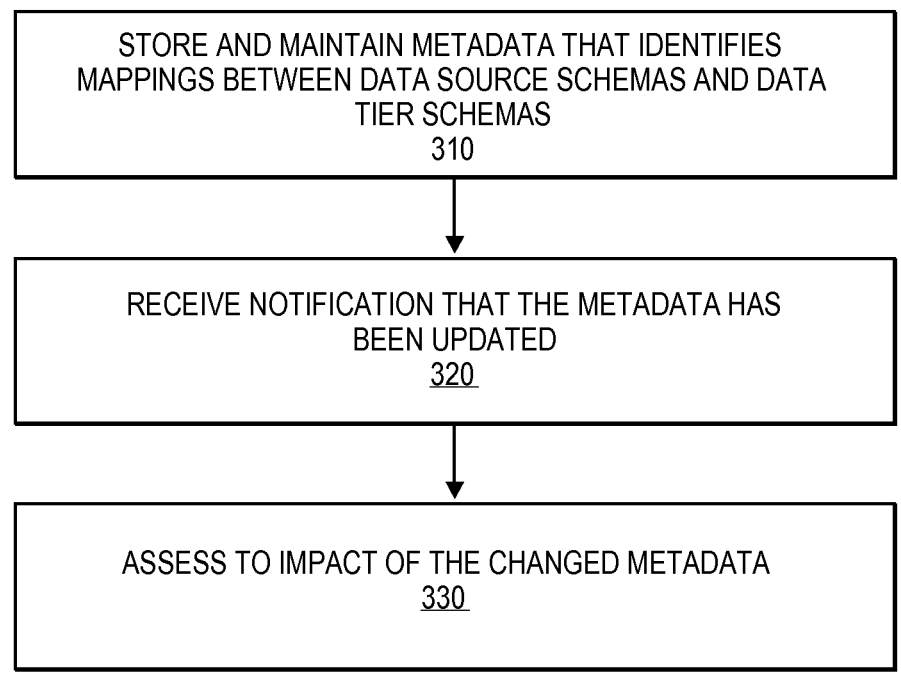
FIG. 2 is a flowchart illustrating the steps performed by a data management system which supports customer customizations according to an embodiment of the invention.

FIG. 2 is a flowchart illustrating the steps performed by a data management system which supports customer customizations according to an embodiment of the invention. The purpose of the steps of FIG. 2 is to support customizer customizations performed to system 100 in response to the operator of system 100 deploying a new customer-wide version of data tier structure data 184. The steps of FIG. 2, except where explicitly noted, may be performed by one or more software modules 190 in an automated fashion without any input or instruction from a user. Where input from a user is required, software modules 190 may solicit such input in a convenient manner through a user interface displayable to the user. For purposes of providing a clear explanation, the description of the steps of FIG. 2 shall be explained below with reference to FIG. 1; however, those in the art shall appreciate the embodiments of the invention may be employed with a variety of different implementations of the data tier.

Throughout the description below of the steps of FIG. 2, reference may be made to a customer. It should be understood that, as used herein with reference to the data management system of an embodiment, the term customer refers to a particular entity (such as a company or organization) that chooses to employ the service of the data management system. As such, each customer who uses system 100 would have their own set of data managed by their own instance of the components depicted in FIG. 1. Also, each customer would have their own set of metadata stored in their instance of metadata repository 180, as the customizations described by the stored metadata are on a per customer basis.

A customer may make one or more customizations to components of system 100. Such customizations will be recorded and reflected in the metadata stored in metadata repository 180. Additionally, periodically the operator of system 100 may release a new version of the data management system, including, but not limited to, a new version of the data tier schemas used by the data tier, a new set of reports, and a new set of ETL processes, for example. Such a release would be available to all customers. Accordingly, when such a customer-wide release is made, customization preservation module 198 may be used to determine which customer specific customizations can be supported in the new release. FIG. 2 depicts a process used by an embodiment to determine which customer specific customizations can be supported in the new release of data tier structure data 184, and as best possible, support them in an efficient manner without requiring user input or instruction.

In step 310 of FIG. 2, metadata is stored and maintained in metadata repository 180. The metadata stored in metadata repository 180 describes the customizations performed by a customer to system 100; the information described by the metadata stored in metadata repository 180 is used for different purposes. To better understand how metadata may be used, different types of metadata based on its intended use are described herein. Specifically, the metadata stored and maintained in metadata repository may correspond to source structure metadata 182, data tier structure metadata 184, and mapping data 186. Source structure metadata 182 describes the structure, characteristics, and configurations of a data source (including the data source schemas), data tier structure metadata 184 describes the structure, characteristics, and configurations of aspects of the data tier (including data tier schemas), and mapping data 186 describes a mapping or relationship between attributes of data source schemas to attributes of data tier schemas. Those skilled in the art shall appreciate that a single set of metadata may be used for multiple purposes; therefore, a single set of metadata may qualify as one or more of mapping data 182 and structure data 186.

Initially, a default set of metadata may be stored in metadata repository 180 based upon the out-of-box structure of the particular data sources and data management applications in system 100. For example, if a particular customer wishes to use a particular data warehouse application and two different known data sources, then since the data schemas used by these the data warehouse application and the two known data sources are known to the operators of system 100, source structure data 182, data tier structure data 184, and mapping data 186 for default (i.e., uncustomized or unaltered) deployments of these data schemas may be stored in metadata repository 180. The initial set of metadata stored in metadata repository 180 may reflect best practices and thoughtful consideration of how the data schema at the data tier should be structured and map to the data source schemas used by data sources desired for use by the customer. Over time, the metadata stored in metadata repository 180 may be updated to accommodate a particular customization performed or requested by a customer.

In step 320, the operator of system 100 deploys a new customer-wide version of data tier structure data 184. As a result of updating data tier structure data 184, the data tier schemas will likely change. The mapping between the schemas used by data sources and the schemas used by data tier 120A will need to be updated to reflect the new data tier schemas. Additionally, a particular customer may have updated a particular aspect of data tier 120A, such as some aspect of a data tier schemas, a report, a dashboard function, and ETL process, and the like. Consequently, as a result of the operator of system 100 updating the data tier stricture data 184 to a new version across all customers, each customer's copy of the data tier stricture data 184 may need to change in different ways to carry forward the particular customizations made by the customer. Indeed, certain customizations may not even be supportable in the new version of the data tier structure data 184.

Therefore, in an embodiment, upon the operator of system 100 deploying a new customer-wide version of data tier structure data 184, customization preservation module 198 detects, or is otherwise notified, that a new version of data tier structure data 184 has been stored in metadata repository 180.

In step 330, the impact of the updated metadata stored in metadata repository 180 is assessed by customization preservation module 198. In an embodiment, the process followed by customization preservation module 198 for handling the implementation of customizations requested by customers relies on the identification of a customization set and a characterization of whether the customization set is overlapping or non-overlapping. A customization set is a unit of changes made to an aspect of system 100, such as a change to a data source schema, a data tier schema, a report generated by a data management application, or an ETL process. A customization set which can be preserved simply without further analysis is deemed to be non-overlapping; conversely, a customization set which requires further analysis to determine whether the customization can be supported is deemed to be overlapping.

Customizations may be performed to various facets of system 100. For example, a customer may choose to customize a data source schema, a data tier schema, a report generated by a data management application, and/or an ETL process. This identification and characterization of customization sets involves these various types of customizations. Non-limiting, illustrative examples of identifying and characterizing customization sets shall be explained below with reference to FIGS. 3-6.

FIG. 3 is a chart illustrating how customizations performed to a data source schema may be assessed by customization preservation module 198 according to an embodiment of the invention. Row 410 of FIG. 3 indicates that when a customer requests that a data source schema be updated to include a new source attribute (or column) that maps to a new attribute (or column) of an existing entity (or table) of a data tier schema, the customization is not an overlapping customization. This customization implies that the mapping of an existing entity of a data tier schema be updated to include reference to an additional column of the data source schema. In the performance of a new release of the data tier schema used by all customers, the new version of the data tier schema for the particular customer requesting this customization would be altered to add the new attribute along with its customer suggested mapping, except for when the entity to which the new attribute was mapped to in data tier schema had been dropped in which case the customer would be notified that the customization could no longer be supported. There is a possibility that the customization requested by the customer has been widely adopted; for example, if in the release update has a similar attribute added with the same mapping as in the customer's customization, this could be indicative that the particular customization has become mainstream and widely adopted. In this situation, the customer would be notified and if the customer is agreeable, the customization may be removed as deviation from the default structure is no longer necessary to accommodate this particular customer request.

Row 412 of FIG. 3 indicates that when a customer requests that a data source schema be updated to include a new source attribute (or column) that maps to an existing attribute (or column) of an existing entity (or table) of a data tier schema, the customization is an overlapping customization. This customization implies that the mapping of an existing entity of a data tier schema be changed for a particular attribute. In the performance of a new release of the data tier schema used by all customers, the metadata for the customer would be updated to include the mapping for the particular attribute desired by the customer, which may require the addition of a column if the column was dropped as part of the release update. Note that if the entity (or table) of the data tier schema was dropped during the release update, then the customer is alerted that the customization cannot be supported.

Row 414 of FIG. 3 indicates that when a customer requests that a data source schema be updated to include a new source attribute (or column) that maps to a new entity (or table) of a data tier schema used by data tier 120A, the customization is a non-overlapping customization. On a customer-wide release of a new version of a data tier schema used by data tier 120A, metadata for the customer will be updated so that the new entity is added back to the data tier schema along with the mapping to the data source schema desired by the customer.

Row 416 of FIG. 3 indicates that when a customer requests that a data source schema be updated to include a new source entity (or table) mapped to one or more new entities (or tables) of a data tier schema used by data tier 120A, the customization is deemed a non-overlapping customization. On a customer-wide release of a new version of a data tier schema used by data tier 120A, metadata stored in metadata repository 180 in the instance associated with the customer will be updated so that the new entities (or tables) requested by the customer to be added to the data source schema and the data tier schema will be done so. In addition, the metadata stored in metadata repository 180 will be updated to add back the mappings between the new entities (or tables) added to the data source schema and the data tier schema.

Row 418 of FIG. 3 indicates that when a customer requests that a data source schema be updated to include a new source entity (or table) mapped to one or more existing entities (or tables) of a data tier schema used by data tier 120A, the customization is deemed an overlapping customization. This customization implies that the mapping for an existing entity (or table) of a data tier schema is changing so that it is now mapped to an entity (or table) of a data source schema which has been added due to a customer supplied customization and is not part of the default data source schema. On a customer-wide release of a new version of a data tier schema used by data tier 120A, metadata stored in metadata repository 180 in the instance associated with the customer will be updated so that the new entity (or table) added to the data source schema by the customer will be added along with the mapping between the added source entity (or table) and the one or more existing entities (or tables) of a data tier schema used by data tier 120A. However, further analysis may be required to ascertain whether this customization can be preserved in the new customer-wide release of the new version of a data tier schema, because if new columns have been added to the data tier schema then the customer customization cannot be propagated; this is so because the new columns would at best get default values. As a result, input would be sought from the customer as to how to handle the situation, which might be remedied via a merged mapping. If, on the other hand, the change to the data tier schema is limited to dropping some columns or changing their types, the customization can be preserved automatically by just taking forward the new entity of the data source schema and its mappings to the surviving columns; however, the customer is still notified of the issue.

Row 420 of FIG. 3 indicates that when a customer requests that a data source schema be updated to include a new source entity (or table) mapped to a mix of one or more existing entities (or tables) and one or more new entities (or tables) of a data tier schema used by data tier 120A, the customization is deemed an overlapping customization. This situation is handled the same way as described above with reference to row 418 with the addition of updating metadata to add back of the new entities.

Row 422 of FIG. 3 indicates that when a customer requests that a data source schema be updated to include a new source entity (or table) joined with one or more existing entities (or tables) and then mapped to one or more new entities (or tables) of a data tier schema used by data tier 120A, the customization is deemed a non-overlapping customization. Given that the new mapping refers to an existing entity(s) of the data source schema, there would be no impact upon future customer-wide releases of new versions of the data tier schema used by data tier 120A; consequently, this situation may be handled in the same way as described above with reference to row 416.

Row 424 of FIG. 3 indicates that when a customer requests that a data source schema be updated to include a new source entity (or table) joined with one or more existing entities (or tables) and then mapped to one or more existing entities (or tables) of a data tier schema used by data tier 120A, the customization is deemed to be an overlapping customization. Given that the new mapping refers to an existing entity(s) of the data source schema, there would be no impact upon future customer-wide releases of new versions of the data tier schema used by data tier 120A; consequently, this situation may be handled in the same way as described above with reference to row 418.

Row 426 of FIG. 3 indicates that when a customer requests that a data source schema be updated to include a new source entity (or table) joined with one or more existing entities (or tables) and then mapped to a mix of one or more existing entities (or tables) and one or more new entities (or tables) of a data tier schema used by data tier 120A, the customization is deemed to be an overlapping customization. Given that the new mapping refers to an existing entity(s) of the data source schema, there would be no impact upon future customer-wide releases of new versions of the data tier schema used by data tier 120A; consequently, this situation may be handled in the same way as described above with reference to row 420.

Row 428 of FIG. 3 corresponds to the situation where a particular customer an attribute of a source data model which has been mapped to an attribute of a data tier schema is missing. Such a situation is deemed to be an overlapping customization. On a customer-wide release of a new version of a data tier schema used by data tier 120A, metadata stored in metadata repository 180 in the instance associated with the customer will be updated to drop the attribute of the data source schema which is not in the customer installation and any attributes of the data tier schema to which it is mapped. In addition, the metadata will be updated to remove any expressions that attribute is used in. The customer may be notified of the resolution of this situation as well.

Row 430 of FIG. 3 indicates that when a customer requests changes to the name and/or type of attributes of a data source schema that are mapped to attributes of a data tier schema, the customization is deemed to be a non-overlapping customization. On a customer-wide release of a new version of a data tier schema used by data tier 120A, metadata stored in metadata repository 180 in the instance associated with the customer will be updated so that the name and/or type of attributes of a data source schema will be updated as desired by the customer. Note that if either the attributes of the data tier schema or the entire entity associated with the attributes has been removed, then no further action is required.

Row 432 of FIG. 3 corresponds to the situation where entities of a source data model are mapped to one or more entities in the data tier schema, and those entities in the data tier schema are absent. This situation is deemed to be a overlapping customization. On a customer-wide release of a new version of a data tier schema used by data tier 120A, metadata stored in metadata repository 180 in the instance associated with the customer will be updated to remove the entities of the source data model source, as they are mapped to entities which no longer exist in the data tier schema.

Row 434 of FIG. 3 corresponds to the situation where entities of a source data model are joined with others and then mapped to one or more entities in the data tier schema, and those entities in the data tier schema are absent. This situation is deemed to be an overlapping customization. On discovering this circumstance, further evaluation is performed to ascertain if the mapping can be modified to work without the entities in the data source schema in the customer's installation. If so, then mapping data 182 is updated to preserve the modified mapping; if not, then the one or more entities in the data tier schema are dropped in the customer's installation along with any missing entities of the data source schema. On a customer-wide release of a new version of a data tier schema used by data tier 120A, we carry forward the changes made when this customization was discovered unless the entities in the data tier schema have been modified in which case manual input is required to address this situation.

Row 436 of FIG. 3 corresponds to the situation where entities of a source data model are renamed. This customization is deemed to be a non-overlapping customization. On discovery, metadata stored in metadata repository 180 to incorporate, in all occurrences, the name of the data source schema entity in the customer instance. On a customer-wide release of a new version of a data tier schema used by data tier 120A, metadata stored in metadata repository 180 in the instance associated with the customer will be updated so that the entities of the source data model will be renamed to preserve the customization. Further, any reference to that renamed entity will also reflect the new name.

FIG. 4 is a chart illustrating the how customizations performed to the schema used by data tier 120 (the data tier schema) may be assessed by customization preservation module 198 according to an embodiment of the invention. Row 510 of FIG. 4 indicates that when a customer requests the addition of a new metric or attribute to a data tier schema used by data tier 120A, where the new metric or attribute is computed from attributes of an existing data source schema, the customization is deemed a non-overlapping customization. On a customer-wide release of a new version of a data tier schema used by data tier 120A, the customization is propagated updating metadata stored in the metadata repository 180 in the instance associated with the customer to add back the new metric or attribute along with its mapping. There is a small possibility that on a customer-wide release a similar attribute or mapping with the same mapping as the customer customization has been added to the data tier schema. In such a case, versioning module 196 flags this customization so the customer may be notified. A possibility exists that this customization has been incorporated into the uncustomized versions of the data source or the data tier, in which case the customer no longer needs to make any customization for system 100 to operate per the customer's wishes.

Row 512 of FIG. 4 indicates that when a customer customizes an existing metric calculation, the customization is an overlapping customization. On a customer-wide release of a new version of a data tier schema used by data tier 120A, the customization is preserved as long as all required constituents for the calculation are still available; if all required constituents for the calculation are not available, then the schema is altered to add back the required constituents and the customization is propagated.

Row 514 of FIG. 4, indicates that when a customer adds, to a data tier schema, a new attribute (or column) that is mapped to an already existing entity (or table) of a data source schema, the customization is a non-overlapping customization. On a customer-wide release of a new version of a data tier schema used by data tier 120A, the data tier schema for the customer is altered to add back the customer attribute along with its mapping.

Row 516 of FIG. 4 indicates that when a customer adds, to a data tier schema, a new attribute (or column) that is mapped to a new entity (or table) of a data source schema, this customization is deemed to be a non-overlapping customization. On a customer-wide release of a new version of a data tier schema used by data tier 120A, the data tier schema for the customer is altered to add back the new attribute (or column) along with new entity (or table) of a data source schema and the mapping there between.

Row 518 of FIG. 4 indicates that when a customer adds, to a data tier schema, a new dimension or fact table mapped to one or more already existing entities (or tables) of a data source schema, the customization is a non-overlapping customization. On a customer-wide release of a new version of a data tier schema used by data tier 120A, the data tier schema for the customer is updated to add back the new dimension or fact table along with the mapping to the one or more already existing entities (or tables) of a data source schema.

Row 520 of FIG. 4 indicates that when a customer adds, to a data tier schema, a new dimension or fact table mapped to one or more new tables of a data source schema, the customization is deemed to be a non-overlapping customization. On a customer-wide release of a new version of a data tier schema used by data tier 120A, the data tier schema for the customer is updated to add back the new dimension or fact table along with the mapping to the one or more new tables of a data source schema.

FIG. 5 is a chart illustrating the how customizations made to reports generated by one or more of data management applications 112, 114, 116, and 118 may be assessed by customization preservation module 198 according to an embodiment of the invention. Row 610 of FIG. 5 indicates that when a new report is created for a customer, this customization is deemed to be a non-overlapping customization. On a customer-wide release of reports supported by system 100, the new report is recreated as long as the required constituents are present.

Row 612 of FIG. 5 indicates that when a customer modifies an existing report to use one or more new attributes or metrics on existing entities, the customization is deemed to be a non-overlapping customization. On a customer-wide release of new reports supported by system 100, if the customized report has not changed and the customers attribute and metric customizations have been preserved, then the customized report is supported; otherwise the default version of the report is used by system 100 and the customer is notified of the discrepancy.

Row 614 of FIG. 5 indicates that when a customer modifies an existing report to include data stored by one or more new entities, the customization is a non-overlapping customization. On a customer-wide release of new reports supported by system 100, if the customized report has not changed and the new entities are still available, then the customized report is supported; otherwise the default version of the report is used by system 100 and the customer is notified of the discrepancy.

Row 616 of FIG. 5 indicates that when a customer modifies an existing report to cease using data stored by one or more new entities, the customization is a non-overlapping customization. On a customer-wide release of new reports supported by system 100, if the customized report has not changed, then the customized report is supported; otherwise the default version of the report is used by system 100 and the customer is notified of the discrepancy.

FIG. 6 is a chart illustrating how customizations made to ETL processes may be assessed by customization preservation module 198 according to an embodiment of the invention. Row 710 of FIG. 6 indicates that when a customer changes the list of Slowly Changing Dimension (SCD) columns for existing dimensions in an ETL process, the customization is deemed to be an overlapping customization. On a customer-wide release of a new version of ETL processes within system 100, the customization is carried forward if the referred to columns are still available; otherwise the SCD columns from the new release are kept and the customer is alerted of the change.

Row 712 of FIG. 6 indicates that when a customer changes an existing lookup operation in an ETL process, the customization is deemed to be an overlapping customization. On a customer-wide release of a new version of ETL processes within system 100, the customization is carried forward if the constituent columns are still available; otherwise the lookup definitions from the new release are kept and the customer is alerted of the change.

Row 714 of FIG. 6 indicates that when a customer creates new Lookup operations for an ETL process, the customization is deemed to be a non-overlapping customization. On a customer-wide release of a new version of ETL processes within system 100, the customization is carried forward if the constituent columns are still available; otherwise the Lookup definitions from the new release are kept and the customer is alerted of the change.

To assess the impact of performing an overlapping change, in an embodiment customization preservation module 198 may traverse a dependency graph associated with the change to determine which objects associated with the change are impacted. As an example, if a change is made to a particular entity of a source data model, then customization preservation module 198 may determine what portions of the metadata stored in metadata repository 180 and what ETL operations are affected, as these portions of metadata and ETL operations will need to be modified to accurately reflect the new state of the particular entity. For non-overlapping changes (termed "lossless changes"), customization preservation module 198 will automatically preserve the customizations.

Any existing ETL operations may be updated to reflect updated metadata stored in metadata repository 180. In an embodiment, a code generator module 197 is invoked to update jobs which will pass different parameters to CDC (or other transforms) if needed. The parameters are passed at compilation time to create a deterministic job based on a particular snapshot of metadata which allows metadata repository 180 to be independently updated between the time the job is generated and the time the job is run. In this way, any existing ETL processes impacted by any portions of metadata which have been updated will reflect the updated metadata.

Additionally, if, as a result of modifying the structure of a data tier schema used by data tier 120A, data stored in a data tier schema needs to be moved or reformatted, code generator module 197 may read the metadata stored in metadata repository 180 to perform any necessary data transformation and/or movement. Such data transformations and movements may be performed transparently to the customer and the operator of system 100 in an automated fashion.

Embodiments of the invention may operate with a variety of different workflow engines to programmatically generate ETL workflows based on the metadata stored in metadata repository 180. Additional details for how a process may read metadata and create a process to perform an ETL operation, transform or reformat data, and/or move data is described in U.S. patent application Ser. No. 14/215,547, filed on Mar. 17, 2014, entitled Common Extract Store, and U.S. Pat. No. 7,987,159, entitled "Detecting and Managing Changes in Business Data Integration Solutions," filed on Sep. 15, 2006.

Hardware Mechanisms

Figure 7:
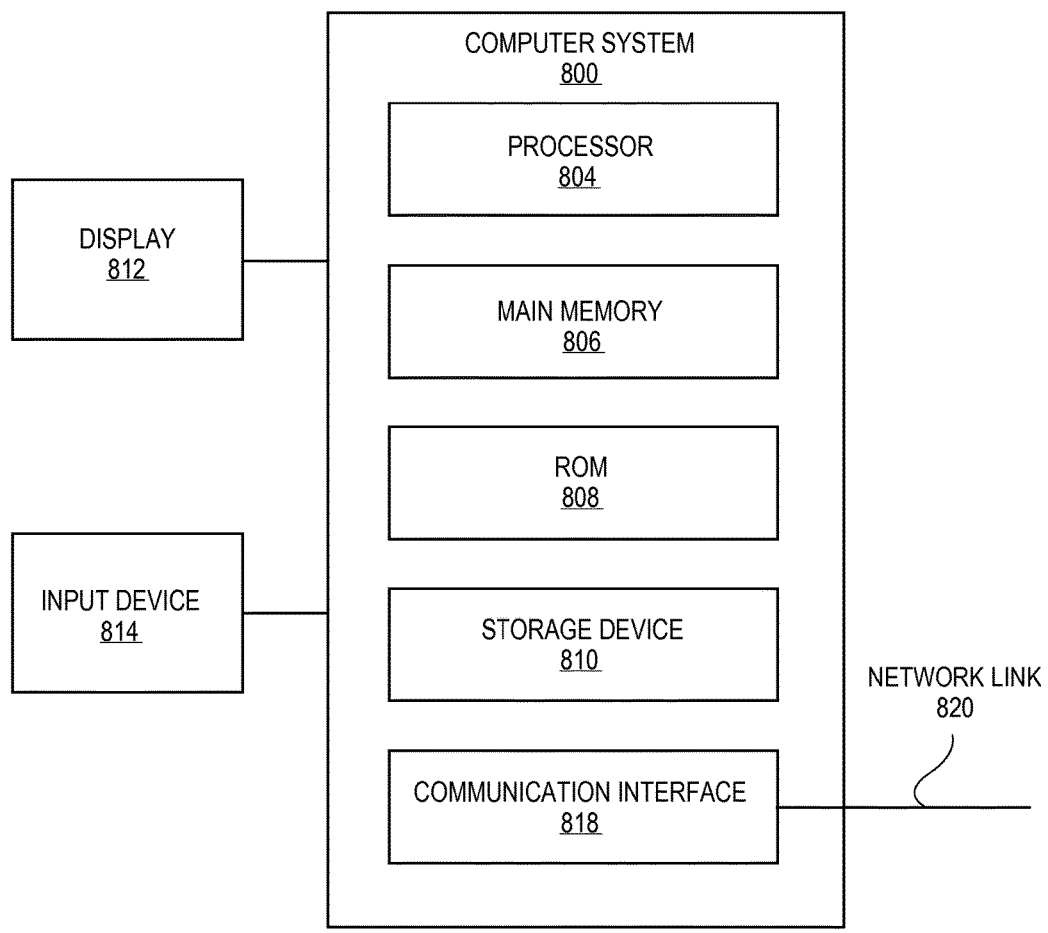
FIG. 7 is a block diagram that illustrates a computer system upon which an embodiment of the invention may be implemented.

In an embodiment, each of the software components depicted in FIG. 1 may be implemented on one or more computer systems. FIG. 7 is a block diagram that illustrates a computer system 800 upon which an embodiment of the invention may be implemented. In an embodiment, computer system 800 includes processor 804, main memory 806, ROM 808, storage device 810, and communication interface 818. Computer system 800 includes at least one processor 804 for processing information. Computer system 800 also includes a main memory 806, such as a random access memory (RAM) or other dynamic storage device, for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device for storing static information and instructions for processor 804. A storage device 810, such as a magnetic disk or optical disk, is provided for storing information and instructions.

Computer system 800 may be coupled to a display 812, such as a cathode ray tube (CRT), a LCD monitor, and a television set, for displaying information to a user. An input device 814, including alphanumeric and other keys, is coupled to computer system 800 for communicating information and command selections to processor 804. Other non-limiting, illustrative examples of input device 814 include a mouse, a trackball, or cursor direction keys for communicating direction information and command selections to processor 804 and for controlling cursor movement on display 812. While only one input device 814 is depicted in FIG. 7, embodiments of the invention may include any number of input devices 814 coupled to computer system 800.

Embodiments of the invention are related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 804 for execution. For example, the instructions may initially be carried on a magnetic disk of a remote computer. The remote computer can load the instructions into its dynamic memory and send the instructions over a network link 820 to computer system 800.

Communication interface 818 provides a two-way data communication coupling to a network link 820 that is connected to a local network. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through a local network to a host computer or to data equipment operated by an Internet Service Provider (ISP).

Computer system 800 can send messages and receive data, including program code, through the network(s), network link 820 and communication interface 818. For example, a server might transmit a requested code for an application program through the Internet, a local ISP, a local network, subsequently to communication interface 818. The received code may be executed by processor 804 as it is received, and/or stored in storage device 810, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

What is claimed is:

1. A non-transitory computer-readable storage medium storing one or more sequences of instructions for preserving customer specific customizations made in a current version of an analytics application, to a new version of the analytics application, which when executed by one or more processors, causes:

tracking of customizations in the current version of the analytics application performed for a customer reflected in metadata where the customizations comprise a sequence of changes to metadata elements representing (i) a data source, (ii) a data tier model, (iii) mappings between the data source and the data tier model describing Extract Transform Load (ETL) pipeline, or (iv) the reports generated based on the data tier model, along with the grouping of customizations performed together as a customization set;

automatically determining that a change made to a metadata element is an overlapping change that is associated with a class of changes which require additional analysis when upgrading the customer's analytics application to a release of a new version of the analytics application to determine if the change can be preserved, wherein the change is automatically determined as an overlapping change and preserved upon considering factors comprising: (a) the change involves a new attribute of a data source schema mapped to an existing attribute of a data tier schema, wherein the metadata for the customer is updated to include a mapping for a particular attribute desired by the customer by adding the existing attribute if the existing attribute was dropped as part of the release of the new version of the analytics application, (b) the change involves a new entity of the data source schema mapped directly, or indirectly by being joined first with other tables, to a set of existing entities of the data tier schema, wherein the metadata associated with the customer is updated so that the new entity added to the data source schema by the customer is added along with the mapping between an added source entity and to one or more existing entities of the data tier schema, and wherein when the change occurring to the data tier schema is limited to dropping columns or changing types of columns, the new entity of the data source schema is taken forward to surviving columns, (c) the change involves a new entity of the data source schema which is mapped directly, or indirectly by being joined first with other tables, to an existing entity and then mapped, at least partially, to a set of one or more existing entities and one or more new entities of the data tier schema, wherein the metadata associated with the customer is updated to add back the one or more new entities, wherein the new entity added to the data source schema by the customer is added along with the mapping between an added source entity and to one or more existing entities of the data tier schema, and wherein when the change occurring to the data tier schema is limited to dropping columns or changing types of columns, the new entity of the data source schema is taken forward to surviving columns, (d) the change involves a mapped attribute of the data source schema which is presently absent, which requires on release update, altering a customer instance schema, dropping a source attribute which is not in a customer installation and a data source entity attribute it is mapped to, as well as any expressions it is used in, (e) the change involves an entity of the data source schema which is mapped directly, or indirectly by being joined first with other tables, to entities of the data tier schema which are presently absent, which requires on a release update, dropping source entities which are not in the customer installation and the data tier entities and downstream objects that they were mapped to if the mapping cannot be modified to work without absent source entities, (f) the change involves an existing metric calculation customization, that is preserved on a release update as long as all required constituents for the calculation are still available, if not a customer instance schema is altered to add back the required constituents to preserve the customization, (g) the change involves a list of slowly changing dimension columns for existing dimensions, that is preserved on a release update if referred to columns are still available, otherwise the slowly changing dimension columns from a new release are retained and the customer is alerted of the change, and (h) the change involves a modification to an existing ETL lookup that is preserved on a release update if the constituent columns are still available, otherwise lookup definitions from the new release are retained and the customer is alerted of the change;

annotating said customization set in the metadata to be overlapping;

performing a responsive action based on a customer input that comprises actions to be performed in response to the overlapping changes requiring customer input; and enabling the implementation of preservable customizations made in the current version to the new version of the analytical application, wherein for each overlapping customization set, dynamically generating first software processes, without human input or instruction, which when executed cause additional analysis to be performed to automatically determine whether the overlapping change can be preserved in the new version of the analytical application based on a case by case analysis using lineage information and a dependency graph associated with the entities impacted by the overlapping change.

2. The non-transitory computer-readable storage medium of claim 1, wherein execution of the one or more sequences of instructions further comprises:

determining that the change is a non-overlapping change if one or more of the following conditions is met: (a) the change involves a new attribute of the data source schema mapped to a new attribute of an existing entity of the data tier schema, (b) the change involves a new attribute of the data source schema mapped to a new entity of the data tier schema, (c) the change involves a new entity of the data source schema mapped to one or more new entities of the data tier schema, (d) the change involves a new entity of the data source schema which is joined with an existing entity and then mapped to one or more new entities of the data tier schema, (e) the change involves modifications to mapped attributes of the data source schema, or (f) the change involves a difference in a name of an entity of the data source schema.

3. The non-transitory computer-readable storage medium of claim 1, wherein execution of the one or more sequences of instructions further comprises:

determining that the change is a non-overlapping change if one or more of the following conditions is met: (a) the change involves a new metric or new aggregate in an entity of the data tier schema, (b) the change involves a new attribute of the data tier schema mapped to an existing table of the data source schema, (c) the change involves a new attribute of the data tier schema mapped to one or more new tables of the data source schema, (d) the change involves a new dimension or fact table of the data tier schema mapped to one or more existing entities of the data source schema, or (e) the change involves a new dimension or fact table of the data tier schema mapped to one or more new entities of the data source schema.

4. The non-transitory computer-readable storage medium of claim 1, wherein execution of the one or more sequences of instructions further comprises:

determining that the change is a non-overlapping change if one or more of the following conditions is met: (a) the change involves a new report created for a particular customer, (b) the change involves an existing report modified to use one or more new attributes or metric on an existing entity of the data tier schema, (c) the change involves a modification to an existing report to use or drop one or more entities, or (d) the change involves a new ETL lookup.

5. The non-transitory computer-readable storage medium of claim 1, wherein execution of the one or more sequences of instructions further comprises:

determining that the change is a non-overlapping change; and grouping of non-overlapping changes into non-overlapping customization sets, and for each non-overlapping customization set, dynamically generating second software processes, without human input or instruction, which when executed cause the non-overlapping change to be preserved in the new version of the analytics application without human input or instruction and without performing the additional analysis.

6. The non-transitory computer-readable storage medium of claim 1, wherein execution of the one or more sequences of instructions further causes:

using a versioning module to support customer customizations by permitting the metadata to only be updated in discrete increments, wherein each new discrete increment of the metadata comprises: (a) annotations characterizing the change over a prior discrete increment of the metadata, (b) data identifying members of a customization set, and (c) data identifying whether the customization set is overlapping or non-overlapping.

7. The non-transitory computer-readable storage medium of claim 1, wherein execution of the one or more sequences of instructions further cause:

upon determining that a particular schema of the one or more data sources or the one or more data tiers has been updated, reading values from the metadata to dynamically generate software processes to, without human input or instruction, (a) move a portion of data stored in the particular schema to the new version of the data tier schema if a particular software process determines that moving the portion is appropriate or (b) alter the particular schema to include a different set of columns and compute values for those added columns for historical records if the particular software process determines that the alteration of the particular schema is appropriate, wherein said metadata preserves a historical record of any customizations made to the one or more schemas or the one or more data tier schemas; and dynamically generating software processes based on the values from the metadata to (a) update one or more existing ETL processes to reflect an updated state of the one or more data tier schemas and (b) generate any new ETL processes required to retrieve data stored in the one or more schemas and load the retrieved data into the one or more data tier schemas.

8. An apparatus for preserving customer specific customizations made in a current version of an analytics application, to a new version of the analytics application, comprising:

one or more processors; and one or more non-transitory computer-readable storage mediums storing one or more sequences of instructions for preserving customer specific customizations made in a current version of an analytics application to a new version of the analytics application, which when executed by the one or more processors, cause:

tracking of customizations in the current version of the analytics application performed for a customer reflected in metadata where the customizations comprise a sequence of changes to metadata elements representing (i) a data source, (ii) a data tier model, (iii) mappings between the data source and the data tier model describing Extract Transform Load (ETL) pipeline, or (iv) the reports generated based on the data tier model, along with the grouping of customizations performed together as a customization set;

automatically determining, using a customization preservation module, that a change made to a metadata element is an overlapping change that is associated with a class of changes which require additional analysis when upgrading the customer's analytics application to a release of a new version of the analytics application to determine if the change can be preserved, wherein the change is automatically determined as an overlapping change upon considering factors comprising: (a) the change involves a new attribute of a data source schema mapped to an existing attribute of a data tier schema, (b) the change involves a new entity of the data source schema mapped directly, or indirectly by being joined first with other tables, to a set of existing entities of the data tier schema, (c) the change involves a new entity of the data source schema which is mapped directly, or indirectly by being joined first with other tables, to an existing entity and then mapped, at least partially, to a set of one or more existing entities and one or more new entities of the data tier schema, (d) the change involves a mapped attribute of the data source schema which is presently absent, (e) the change involves an entity of the data source schema which is mapped directly, or indirectly by being joined first with other tables, to entities of the data tier schema which are presently absent, (f) the change involves an existing metric calculation customization, (g) the change involves a list of slowly changing dimension columns for existing dimensions, and (h) the change involves a modification to an existing ETL lookup;

annotating said customization set in the metadata to be overlapping;

for each overlapping customization set, dynamically generating, using a code generation module, first software processes, without human input or instruction, which when executed cause the additional analysis to be performed to automatically determine whether the overlapping change can be preserved in the new version of the analytical application based on a case by case analysis using lineage information and a dependency graph associated with the entities impacted by the overlapping change;

performing a responsive action based on a customer input that comprises actions to be performed in response to the overlapping changes deemed non-preservable; and enabling, using the customization preservation module, the implementation of preservable customizations made in the current version to the new version of the analytical application, wherein the customer specific customizations for the overlapping changes are preserved in the new version of the analytical application for the data tier model driven customizations, wherein all required constituents for calculations are still available for a change that involves an existing metric calculation customization; otherwise the schema is altered to add back required constituents and the overlapping customization is propagated for the change and the following ETL driven customizations where:

(a) referred columns are still available for the change that involves a list of slowly changing dimension columns for existing dimensions; otherwise the slowly changing dimension columns from the new version of the analytical application are retained and a customer alert is generated for the change; and (b) constituent columns are still available for the change that involves a modification to an existing ETL lookup; otherwise the lookup definitions from the new version of the analytical application are retained and a customer alert is generated for the change.

9. The apparatus of claim 8, wherein the overlapping customization is preserved in the new version of the analytical application by one or more of the following:

updating the metadata to add a column for the new attribute along with mapping data between the new attribute of the data source schema and the existing attribute of the data tier schema when the change involves the new attribute of the data source schema mapped to the existing attribute of the data tier schema, updating the metadata to add at least one of:
  a table for the new entity along with mapping data between the new entity of the data source schema and the set of existing entities of the data tier schema when the change involves the new entity of the data source schema mapped directly, or indirectly by being joined first with other tables, to the set of existing entities of the data tier schema, or
  a table for the new entity along with mapping data between the new entity of the data source schema and the set of one or more existing entities and one or more new entities of the data tier schema when the change involves the new entity of the data source schema which is mapped directly, or indirectly by being joined first with other tables, to the existing entity and then mapped, at least partially, to the set of one or more existing entities and one or more new entities of the data tier schema,
  wherein (i) if new columns are added to the data tier schema for the new entity in the new version of the analytical application, the overlapping customization cannot be propagated and a customer alert is generated to receive a customer input to preserve the overlapping customization in the new version, or (ii) if one or more columns are removed from the data tier schema, the overlapping customization is automatically preserved for the new entity in the new version of the analytical application, updating the metadata to remove (i) the attribute of the data source schema which is absent in the current version and (ii) attributes of the data tier schema to which the attribute of the data source schema is mapped, when the change involves a mapped attribute of the data source schema which is presently absent, or preserving modified mapping in the new version that works without source entities that are not present or removing the entities in the data tier schema which are mapped to absent entities of the data source schema when the change involves an entity of the data source schema which is mapped directly, or indirectly by being joined first with other tables, to entities of the data tier schema which are presently absent, wherein the modified mapping is preserved when the mapping is modified without the entities in the data source schema in a customer's installation.

10. The apparatus of claim 8, wherein execution of the one or more sequences of instructions further causes:

using a versioning module to support customer customizations by permitting the metadata to only be updated in discrete increments, wherein each new discrete increment of the metadata comprises: (a) annotations characterizing the change over a prior discrete increment of the metadata, (b) data identifying members of a customization set, and (c) data identifying whether the customization set is overlapping or non-overlapping.

11. The apparatus of claim 8, wherein execution of the one or more sequences of instructions further cause:

upon determining that a particular schema of the one or more data sources or the one or more data tiers has been updated, reading values from the metadata to dynamically generate software processes to, without human input or instruction, (a) move a portion of data stored in the particular schema to the new version of the data tier schema if a particular software process determines that moving the portion is appropriate or (b) alter the particular schema to include a different set of columns and compute values for those added columns for historical records if the particular software process determines that the alteration of the particular schema is appropriate, wherein said metadata preserves a historical record of any customizations made to the one or more schemas or the one or more data tier schemas; and dynamically generating software processes based on the values from the metadata to (a) update one or more existing ETL processes to reflect an updated state of the one or more data tier schemas and (b) generate any new ETL processes required to retrieve data stored in the one or more schemas and load the retrieved data into the one or more data tier schemas.

12. A method for preserving customer specific customizations made in a current version of an analytics application, to a new version of the analytics application, comprising:

tracking of customizations in the current version of the analytics application performed for a customer reflected in metadata where the customizations comprise a sequence of changes to metadata elements representing (i) a data source, (ii) a data tier model, (iii) mappings between the data source and the data tier model describing Extract Transform Load (ETL) pipeline, or (iv) the reports generated based on the data tier model, along with the grouping of customizations performed together as a customization set;

automatically determining that a change made to a metadata element is an overlapping change that is associated with a class of changes which require additional analysis when upgrading the customer's analytics application to a release of a new version of the analytics application to determine if the change can be preserved, wherein the change is automatically determined as an overlapping change upon considering factors comprising: (a) the change involves a new attribute of a data source schema mapped to an existing attribute of a data tier schema, (b) the change involves a new entity of the data source schema mapped directly, or indirectly by being joined first with other tables, to a set of existing entities of the data tier schema, (c) the change involves a new entity of the data source schema which is mapped directly, or indirectly by being joined first with other tables, to an existing entity and then mapped, at least partially, to a set of one or more existing entities and one or more new entities of the data tier schema, (d) the change involves a mapped attribute of the data source schema which is presently absent, (e) the change involves an entity of the data source schema which is mapped directly, or indirectly by being joined first with other tables, to entities of the data tier schema which are presently absent, (f) the change involves an existing metric calculation customization, (g) the change involves a list of slowly changing dimension columns for existing dimensions, and (h) the change involves a modification to an existing ETL lookup;

annotating said customization set in the metadata to be overlapping;

for each overlapping customization set, dynamically generating first software processes, without human input or instruction, which when executed cause the additional analysis to be performed to automatically determine whether the overlapping change can be preserved in the new version of the analytical application based on a case by case analysis using lineage information and a dependency graph associated with the entities impacted by the overlapping change;

performing a responsive action based on a customer input that comprises actions to be performed in response to the overlapping changes deemed non-preservable; and enabling the implementation of preservable customizations made in the current version to the new version of the analytical application, wherein the customer specific customizations for the overlapping changes are preserved in the new version of the analytical application by the following:

updating the metadata to add a column for the new attribute along with mapping data between the new attribute of the data source schema and the existing attribute of the data tier schema when the change involves the new attribute of the data source schema mapped to the existing attribute of the data tier schema;

updating the metadata to add a table for the new entity along with mapping data between the new entity of the data source schema and the set of existing entities of the data tier schema when the change involves the new entity of the data source schema mapped directly, or indirectly by being joined first with other tables, to the set of existing entities of the data tier schema;

updating the metadata to add a table for the new entity along with mapping data between the new entity of the data source schema and the set of one or more existing entities and one or more new entities of the data tier schema when the change involves the new entity of the data source schema which is mapped directly, or indirectly by being joined first with other tables, to the existing entity and then mapped, at least partially, to the set of one or more existing entities and one or more new entities of the data tier schema, wherein (i) if new columns are added to the data tier schema for the new entity in the new version of the analytical application, the overlapping customization cannot be propagated and a customer alert is generated to receive a customer input to preserve the overlapping customization in the new version, or (ii) if one or more columns are removed from the data tier schema, the overlapping customization is automatically preserved for the new entity in the new version of the analytical application;

updating the metadata to remove (i) the attribute of the data source schema which is absent in the current version, and (ii) attributes of the data tier schema to which the attribute of the data source schema is mapped, when the change involves a mapped attribute of the data source schema which is presently absent; and updating the metadata preserving modified mapping in the new version that works without source entities that are not present or removing the entities in the data tier schema which are mapped to absent entities of the data source schema when the change involves an entity of the data source schema which is mapped directly, or indirectly by being joined first with other tables, to entities of the data tier schema which are presently absent, wherein the modified mapping is preserved when the mapping is modified without the entities in the data source schema in customer's installation.

13. The method of claim 12, wherein overlapping customization is preserved in the new version of the analytical application if one or more of the following:

all required constituents for the calculation are still available for the change that involves an existing metric calculation customization; otherwise the schema is altered to add back the required constituents and the overlapping customization is propagated for the change, referred columns are still available for the change that involves a list of slowly changing dimension columns for existing dimensions; otherwise the slowly changing dimension columns from the new version of the analytical application are kept and a customer alert is generated for the change, or constituent columns are still available for the change that involves a modification to an existing ETL lookup; otherwise the lookup definitions from the new version of the analytical application are kept and a customer alert is generated for the change.

14. The method of claim 12, further comprising:
using a versioning module to support customer customizations by permitting the metadata to only be updated in discrete increments, wherein each new discrete increment of the metadata comprises: (a) annotations characterizing the change over a prior discrete increment of the metadata, (b) data identifying members of a customized set, and (c) data identifying whether the customized set is overlapping or non-overlapping.

15. The method of claim 12, further comprising:
upon determining that a particular schema of the one or more data sources or the one or more data tiers has been updated, reading values from the metadata to dynamically generate software processes to, without human input or instruction, (a) move a portion of data stored in the particular schema to the new version of the data tier schema if a particular software process determines that moving the portion is appropriate or (b) alter the particular schema to include a different set of columns and compute values for those added columns for historical records if the particular software process determines that the alteration of the particular schema is appropriate, wherein said metadata preserves a historical record of any customizations made to the one or more schemas or the one or more data tier schemas; and dynamically generating software processes based on the values from the metadata to (a) update one or more existing ETL processes to reflect an updated state of the one or more data tier schemas and (b) generate any new ETL processes required to retrieve data stored in the one or more schemas and load the retrieved data into the one or more data tier schemas.

* * * * *